(12) United States Patent
Attar (10) Patent No.: US 7,503,962 B2
(45) Date of Patent: Mar. 17, 2009

(54) END OF SERVICE AND RESIDUAL LIFE INDICATOR

(76) Inventor: Amir J. Attar, 3400 Swift Dr., Raleigh, NC (US) 27606

( * ) Notice: Subject to any disclaimer, the term of this patent is extended or adjusted under 35 U.S.C. 154(b) by 571 days.

(21) Appl. No.: 11/305,645

(22) Filed: Dec. 16, 2005

(65) Prior Publication Data

US 2007/0137491 A1    Jun. 21, 2007

(51) Int. Cl.
B01D 49/00 (2006.01)
(52) U.S. Cl. .................... 96/417; 55/DIG. 34
(58) Field of Classification Search ........... 96/117.5, 96/417; 55/DIG. 34; 34/80
See application file for complete search history.

(56) References Cited

U.S. PATENT DOCUMENTS

| | | | |
|---|---|---|---|
| 4,146,887 A | 3/1979 | Magnante | |
| 4,155,358 A | 5/1979 | McAllister et al. | |
| 4,205,043 A | 5/1980 | Esch et al. | |
| 4,666,859 A | 5/1987 | Attar | |
| 4,684,380 A * | 8/1987 | Leichnitz | ................ 96/117.5 |
| 4,772,560 A | 9/1988 | Attar | |
| 4,840,919 A | 6/1989 | Attar | |
| 5,376,554 A | 12/1994 | Vo-Dinh | |
| 6,701,864 B2 | 3/2004 | Watson, Jr. et al. | |
| 6,979,361 B2 | 12/2005 | Mihayiov et al. | |
| 7,277,019 B2 | 10/2007 | Povenmire | |
| 7,442,237 B1 | 10/2008 | Gardner | |
| 2007/0087444 A1 * | 4/2007 | England | .................... 436/166 |

* cited by examiner

*Primary Examiner*—Robert A Hopkins
(74) *Attorney, Agent, or Firm*—Steven J. Hulquist; Intellectual Property/Technology Law (57) ABSTRACT

An End of Service Life (ESLI) and Residual Life Indicator (RLI), for gas masks and other filters, where the indicator includes a solid conduit with one end closed by a transparent material and the other by a porous material. In one implementation the conduit contains, a powder that can react chromogenically. In another implementation, the porous material includes a reagent that can react with the target gas and release a reactive gas. The transparent end of the conduit is coated internally with a chromogenic reagent that changes color when either the target gas or the gas produced in the reaction reaches it. The ESLI/RLI may be inserted into the filter from different directions to accommodate practical filter or mask designs. The ESLI/RLI may contain more than one chromophore to alert users of the penetration of different gases or classes of gases.

25 Claims, 7 Drawing Sheets

END OF SERVICE AND RESIDUAL LIFE INDICATOR

FIELD OF THE INVENTION

The present invention relates to an apparatus for detecting the penetration of volatile organic compounds through a material acting as a barrier. In particular, it relates to an apparatus that visually shows that vapor has penetrated up to a specified value of the barrier or that visually indicates the residual service life remaining in the material that is acting as a barrier.

BACKGROUND OF THE INVENTION

Among the most commonly used equipment for protecting humans from exposure to toxic materials such as volatile organic compounds are gas masks or respirators and related or similar devices. Toxic gases are encountered in various work environments such as paint booths and laboratories, and chemical warfare agents may be encountered in military or civilian contexts. These gas masks, respirators and related or similar devices have filters that allow the user to breathe air through them, but act as barriers to the toxic materials. The filter typically contains activated carbon or other high surface area materials that rapidly adsorb the toxic gas and prevent it from proceeding along the filter together with the breathable air.

There are two basic ways by which the toxic gas interacts with the adsorbing material. In the first mode, the gas is simply adsorbed reversibly and in the second mode the gas reacts chemically and irreversibly with the adsorbing material or with materials distributed on its surface. In both cases the toxic material is prevented from proceeding along the filter and thus from being breathed by the user. An example of reversible adsorption is that of hydrocarbons or halogenated hydrocarbons on activated carbon. An example of an irreversible reaction is that of hydrocyanic acid with metallic components deposited on the surface of activated carbon.

Every barrier used in gas masks has a finite useful life. Its surface gets saturated and reactive ingredients get consumed by the process of filtering the toxic material. Once consumed, the filtering media ceases to be a barrier and permits the toxic material to move through and poison the breather. This makes the filter ineffective and thus necessitates replacing it or taking other means to protect the user. Since in many cases the user cannot tell that the filter has became ineffective, there is a need to have means to detect that the filter was consumed and to indicate to the user and that he is facing incipient danger.

There are two basic devices in relation to the life of gas masks filters. The first type is called End of Service Life Indicators (ESLI), which indicate that the filter was consumed and cannot be used anymore as a filter. The second is called a Residual Life Indicator (RLI), which indicates how much of the filter was used (or how much is still available for use).

An example of a respirator with an ESLI is described in U.S. Pat. No. 4,155,358. This respirator is a disposable valveless chemical cartridge respirator that removes vinyl chloride monomer from the breathed air and is equipped with an end of service life indicator. The end of service indicator changes its color when the cartridge has been fully utilized. The indicator comprises specially prepared activated alumina granules coated first from a 1% solution of $KMnO_4$, which is then reduced to what is believed to be $MnO_2$, and coated from a 0.55% solution of potassium permanganate. The indicator is viewed through the side wall of the cartridge all along the edge nearest the entrance to the cartridge. The initial color is purple and upon exposure to vinyl chloride, the potassium permanganate is reduced to manganese dioxide such that there is a slow, continuous color change from the purple to brown (the color of manganese dioxide). This design has two key problems. First, it requires a major modification of the casing of conventional gas masks filters and of their manufacturing procedure and machinery, and, second, it indicates only that the cartridge life is beginning to or has expired but it does not permit any estimation or indication of how much life is left in the cartridge.

U.S. Pat. No. 4,146,887 discloses another type of ESLI that consists of two key components: a material that can react exothermally with the gas to be filtered, and a temperature sensor. These two components are placed in the filter or near the face piece cavity of the respirator. Once the polluting (target) gas reaches the absorbent, it reacts with the adsorbent and releases heat. The temperature sensor senses the increase in the temperature of the adsorbent and triggers an alarm when the respirator cartridge has reached the end of its service life. Again, this indicator indicates only that the filter has lost or is about to lose its usefulness. Further, it requires major modification to filters and to filter manufacturing procedures, as well as the provision of power sources to sense the temperature increase and activate the alarm.

Several technologies have been disclosed in which strips are inserted within protective clothing to indicate by color change or other means that gas has permeated therethrough. These devices are not true indicators of the ESL or RSL, but rather of exposure of the person within the protective clothing. Examples of such technologies include U.S. Pat. No. 4,205,043 and U.S. Pat. No. 5,376,554.

U.S. Pat. No. 6,701,864 teaches that the residual life of a filter may be estimated by measuring the size of a stain of colored material placed within the filter and viewed from the outside. This RSLI is useful for specific gases such as hydrocarbons, but its utility is limited since hydrocarbons are adsorbed reversibly and tend to redistribute themselves within the filter. Moreover, the filter design and manufacturing procedure have to be modified to incorporate viewing windows. Since such modifications are rather expensive and are highly undesirable, they limit the commercial utilization of this device.

An object of the present invention is to provide a residual life indicator which, through visual indication such as a color change, will indicate that the useful life of the filter is about to end. For example, the indicator may be set to indicate when only 10% of the filter is left available for use.

Another objective of the present invention is to provide an ESLI that can be used with almost all conventional filters with only a very minimal change in their design.

Another objective of the present invention is to provide a highly versatile RSLI that can be easily be changed to meet the specific safety objectives of the user.

Another objective of the present invention is to provide an RSLI that indicates several levels of utilization of the filter to permit proper or orderly replacement.

Another objective of the present invention is to provide an RSLI or and ESLI that is extremely simple and easy to use even by untrained personnel.

Yet another objective of the present invention is to provide an RSLI or ESLI that does not require any power sources, computers or any other external or instrumental means to enable the user to determine the status and utility of his filter, before any exposure has occurred.

Other objects, features and advantages of the invention will be more fully apparent from the ensuing disclosure and appended claims.

SUMMARY OF THE INVENTION

The present invention relates to a versatile class of devices that can be used in various applications as a residual life indicator or as an end of service life indicator. These devices are adaptable to a wide variety of implementations, and can be used to indicate the residual life when the exposure is to one specific gas, such as for example cyanide, hydrogen sulfide or ammonia, or to a class of compounds, e.g., amines, alcohols or hydrocarbons.

The residual life indicator of the present invention comprises a small solid conduit with one transparent end and a second end closed by a gas-permeable solid barrier. The conduit contains a powder which can move freely from one side of the conduit to the other. The permeable barrier is designed to allow gases to permeate in, while preventing the chromophoric powder from escaping from the conduit. The powder includes a chromophoric material that can change its color in contact with target gas, e.g., a pollutant gas. The conduit is inserted into the filter to a desired depth with the barrier side in the filter. When the polluting gas penetrates through the filter and reaches the permeable barrier, it permeates through it and reacts with the chromophore. The chromophore changes its color, which indicates that the filter has been consumed up to that point. The color change can be viewed via the transparent end of the conduit directly or by tilting the filter to cause the powder to move to the transparent end. Examination of the color of the powder, and whether or not it has changed, provides a clear indication of whether the polluting toxic gas reached the permeable barrier end of the conduit. To facilitate a determination of whether the color changed, one may place near the transparent end of the conduit a printed color chart or a small enclosure with powder in a transparent conduit into which the polluting gas cannot penetrate.

Several variations of the device of the present invention may be implemented, including, without limitation:

1. Inserting several conduits to different depths within the filter bed to give different residual life values, e.g., one will change color when 30% of the filter is still available and the other when only 15% is still available.
2. To make the conduit indicator a totally separate component from the filter itself and to insert it into a hole in the shell only before beginning use of the filter. Until the user is ready to insert the conduit into the filter, the hole in the filter casing will be closed by a removable stopper.
3. To place in the conduit powders with several chromophores that respond colorimetrically to different gaseous pollutants.

The present invention relates to a device that can be used either as an end of service life indicator or as a residual life indicator. The residual life indication most likely to be needed is toward the end of the life of the filter and it will indicate if the filter has more life than a certain percentage. This can be accomplished by inserting two or more conduits into the filter bed. Since the residual life indicator does not require the use of external readers or instruments, its cost can be very low and it is very easy to manufacture and use.

Additional objects, features and advantages of the invention will be readily apparent from the description that follows, and readily derivable by empirical determination without undue effort, based on the description herein.

BRIEF DESCRIPTION OF THE DRAWINGS

The accompanying drawings illustrate various aspects and features of the invention, wherein:

FIG. 1 is a schematic representation of a cross section of a gas filter with an indicator according to one embodiment of the invention installed in it. In this embodiment, the filter body 50 is filled with the filtering material 20. The contaminated gas enters through 40 and the filtered gas enters the gas mask through the screw connection 10. The transparent conduit of the end of service life indicator 30 is installed through a small hole in the filter body and it protrudes into the filtering material a selectable depth. A color chart 35 surrounds the conduit and permits visual comparison of the color of the material in the conduit and the printed colors on the chart. (see FIG. 5 described hereinafter).

DETAILED DESCRIPTION OF THE PREFERRED EMBODIMENTS

Figure 1:
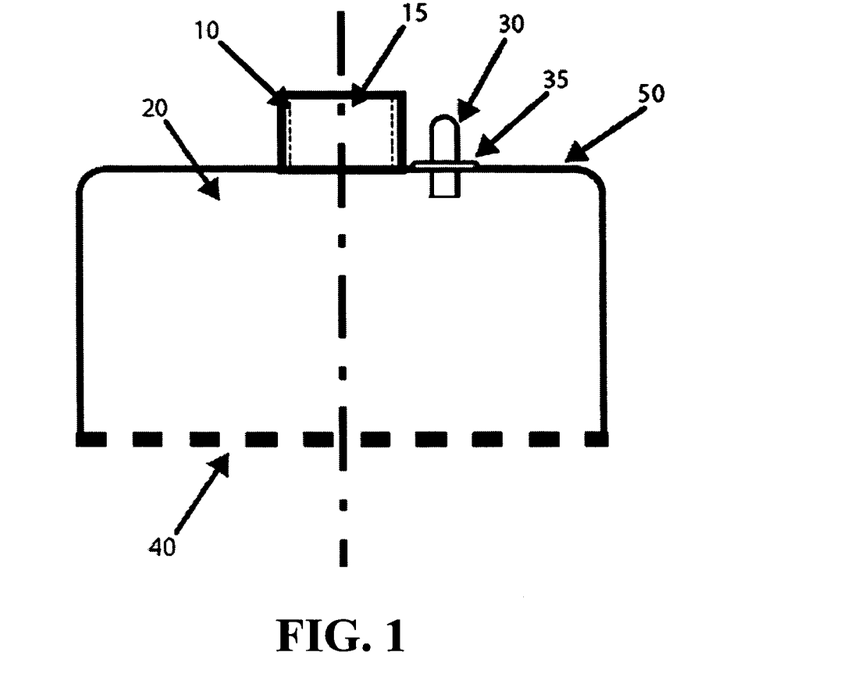
Figure 2:
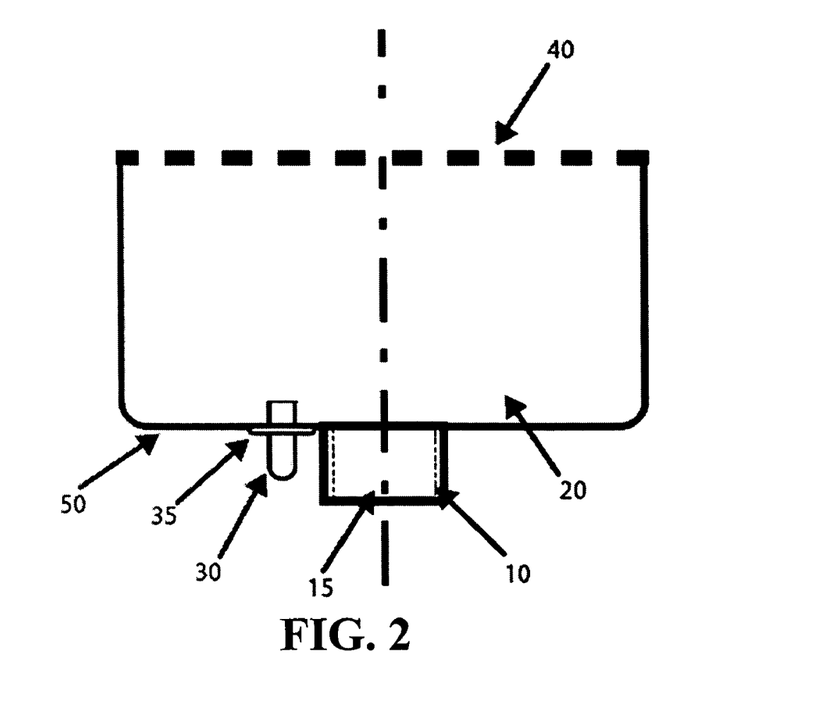
FIG. 2 is a schematic representation of a cross-section of a gas filter with an indicator of the invention installed in it, in a tilted position whereby the powder which can change its color is concentrated on the visible end of the transparent conduit.

Referring again to FIG. 1, which describes one of the preferred embodiments of the invention, one sees that the transparent conduit of the ESLI is inserted into the filter bed to a desired depth. The conduit contains a powder with a chromophore that changes its color when the toxic gas to be filtered reaches the porous end of the conduit that protrudes into the filtering media. The depth of the protrusion determines at which percentage of use of the filter, the indicator is desired to change color. In normal use, the powder is free to move in the conduit but is most likely to be close to the porous entrance. When it is desired to see if the filter has been consumed, the filter is tilted to allow the powder to gravitate to the external transparent end of the conduit. The color change may be viewed by the user or by a second person, depending on the design of the gas mask and the circumstances. FIG. 2 shows the same filter upside down, demonstrating how the powder can move through the conduit to the other side. Note that the ESLI of this invention may be inserted from either side of the filter. The actual utilization will depend on the mask design as well as on the filter design.

Figure 3:
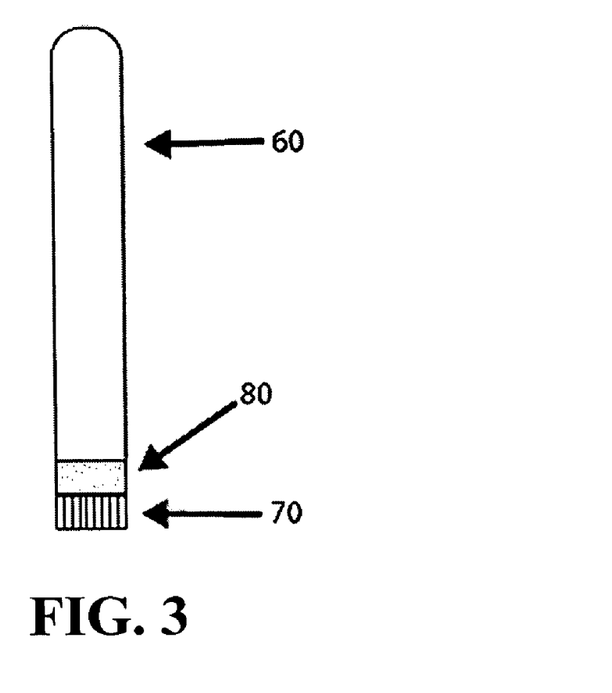
FIG. 3 is a schematic representation of a cross-section of the end of service life indicator (ESLI) of a preferred embodiment of the invention with the chromophoric powder near the entrance to the conduit. The transparent conduit 60 contains a small amount of powder with a chromophoric material 80. The open end of the ESLI is covered by a porous material 70 that permits gas to enter in, but prevents the powder from escaping out.
Figure 4:
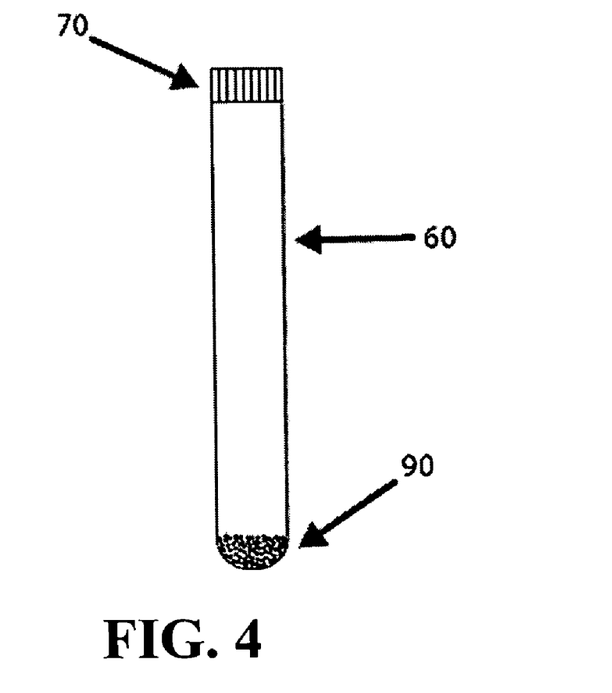
FIG. 4 is a schematic representation of a cross section of the end of service life indicator (ESLI) of the preferred embodiment of the invention, with the chromophoric powder near the visible external end of the conduit 90.

One of the preferred implementations of the ESLI of the present invention is shown in FIG. 3. The ESLI consists of three main components: a conduit, at least one end of which is closed but transparent, 60, a porous barrier 70 that permits air to diffuse into the conduit, but does not let the chromogenic powder escape, and a powder containing a chromophoric material that changes its color when exposed to the target polluting gas. During the use of the mask, the powder is free to move in the conduit but is mainly close to the porous end. The powder is exposed to the gas in the conduit and reacts with it chromogenically whenever the target pollutant reaches the porous entrance to the conduit and penetrates into the conduit. When it is desired to check the filter life, the filter is tilted so the powder moves and concentrates near the close but transparent end of the conduit. In the preferred embodiment of this invention, a printed chart is adhered close to the visible end of the transparent end of the conduit. The chart includes at least two colors, the color of the unreacted powder and the color it assumes after reacting with the target pollutant. By comparing the color of the powder with the color printed on the chart, the user can tell if the pollutant has reached the opening in the tube, i.e., if the filter is still usable or not.

The conduit may be as simple as a transparent plastic or glass tube, sealed at the external end 90 and covered with a porous material 70 at the other end. Rectangular conduits, or conduits with other cross-sections, may be used instead of circular ones. The conduit body may be transparent or not, provided that its end is transparent and permits viewing of the color or other property of the powder. For example, the conduit may be a metallic tube with one end sealed by a transparent polymer.

The powder material may be a porous or non-porous solid such as silica, alumina, various polymers, metals or ceramic materials. The chromophore may be the powder itself or a different material or formulation adsorbed onto the powder particles, filling its pores or coated on it.

The porous entrance to the residual life indicator of this invention may be made of any suitable porous material, including cellulose-based materials such as papers, cotton, fibrous polymeric material, glass fibers or cloth, metallic mesh or other synthetic materials. Polymeric membranes may also be used. The only requirements that control its properties are its porosity or opening size and the size of the powder particles enclosed in the conduit. A simple metallic or plastic screen with openings smaller than the powder particles size can do as good a job as a suitable membrane. Ideally, the porous material should be inert toward the polluting component to be filtered.

Different variations on the technology may be usefully employed. For example, two or more conduits may be inserted into the filter bed to different depths, to alert the user that the filter has been consumed up to different levels. For example, two indicators may be placed, to indicate that 75% of the bed has been consumed and that 95% of the bed has been consumed. Such an arrangement will give the user an opportunity to plan his work and time the filter change to a convenient break point in the project.

The conduit may be inserted into the filter from either end or even from the side to give a maximum flexibility, as needed to accommodate various mask designs.

A color printed chart may be placed around the visible end of the conduit to facilitate the detection of a color chart. Alternatively, a second small and transparent container filled with the original powder may be placed near the transparent indicator, to simplify the detection of even minute color changes.

A mixture of two or more chromophoric powders may be placed in the conduit to give the user an ability to detect the approaching filter end for mixtures of gases or for gases adsorbed at different efficiencies. The color chart associated with indicators with one or more chromophores desirably includes an appropriate color scheme showing the end of use for various gases or gas groups.

The gas mask filters may be shipped with the indicator already installed in them or only with a sealed hole, empty or plugged with a dummy indicator. The indicator is inserted into such hole before use. This gives the user the flexibility to select the right indicator for a specific application, as well as to optimize the use process with respect to selecting indicators based on the optimal aging of the indicators.

Figure 5:
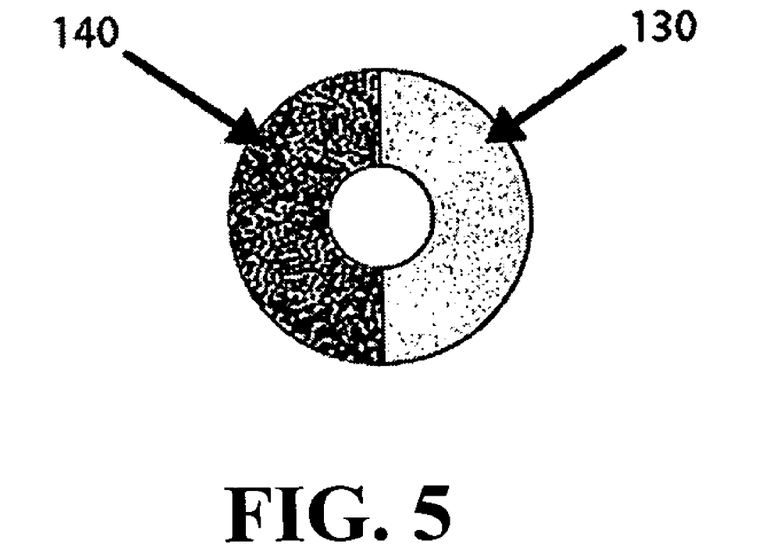
FIG. 5 shows the color chart that is glued to the external part of the filter and around the transparent end of the conduit. The chart has two colors: one shows the powder color before exposure to the toxic gas and the other shows it after the toxic gas reached the ESLI open end and reacted with the chromophore. This arrangement assists the user to recognize that the filter was consumed to the desired indicated level, in other words, that the toxic gas has reached the entrance level where the indicator was inserted into the filter.
Figure 6:
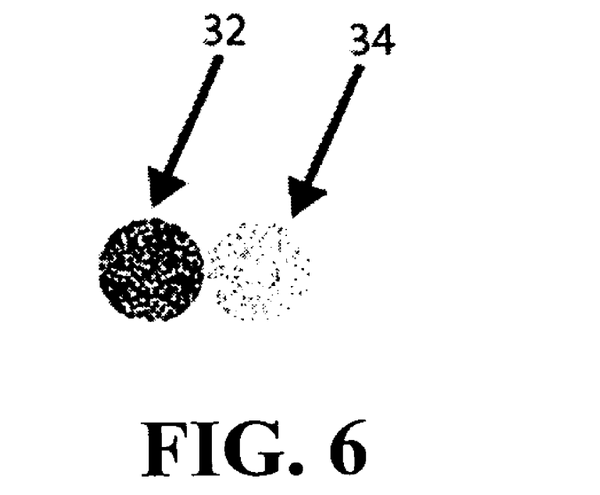
FIG. 6 shows the side of the filter with an alternative color comparison means to the color chart, comprising a transparent but fully closed container with unused chromophoric powder, as another approach to assist the user to detect the end use and understand the results.
Figure 7:
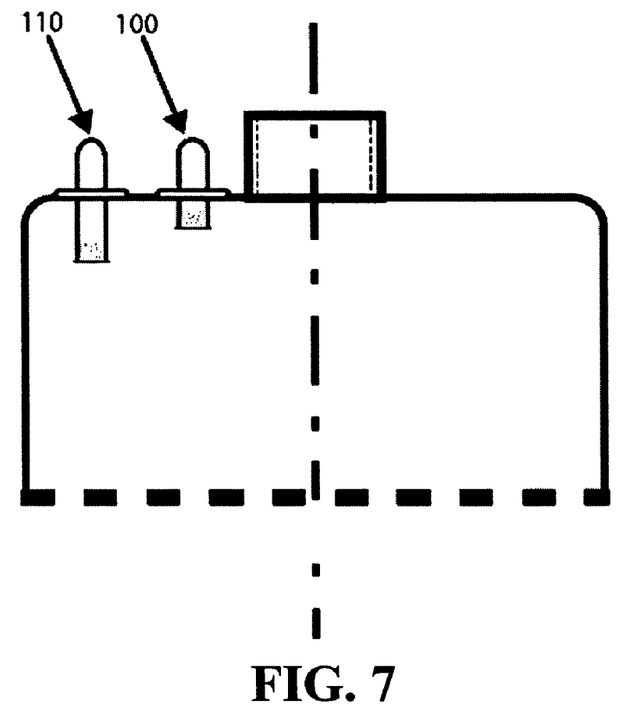
FIG. 7 shows schematically a filter with two conduits at two different depths designed to show the user two different levels of use of the filter. This can give the user an advanced warning that the filter is approaching its end use. For example, the two indicators may be inserted to indicate for example 75 and 90% consumption of the filter.
Figure 8:
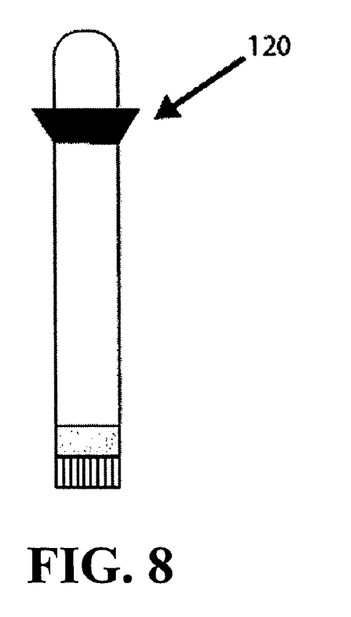
FIG. 8 shows the ESLI in one embodiment in which the conduit is equipped with a seal 120. The ESLI can be inserted into a hole in the filter casing upon need. This permits flexibility in the use of the filter for different gases as well as effective management of the aging of the ESLI.
Figure 9:
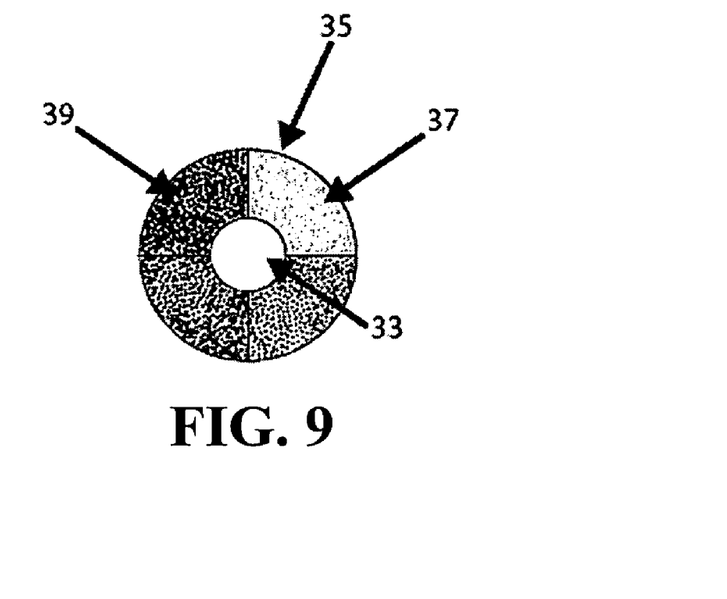
FIG. 9 shows a color chart with multiple colors to help the user recognize the ESLI properly when a mixture of chromophores is placed in the conduit for detecting the breakthrough of two different classes of compounds.
Figure 10:
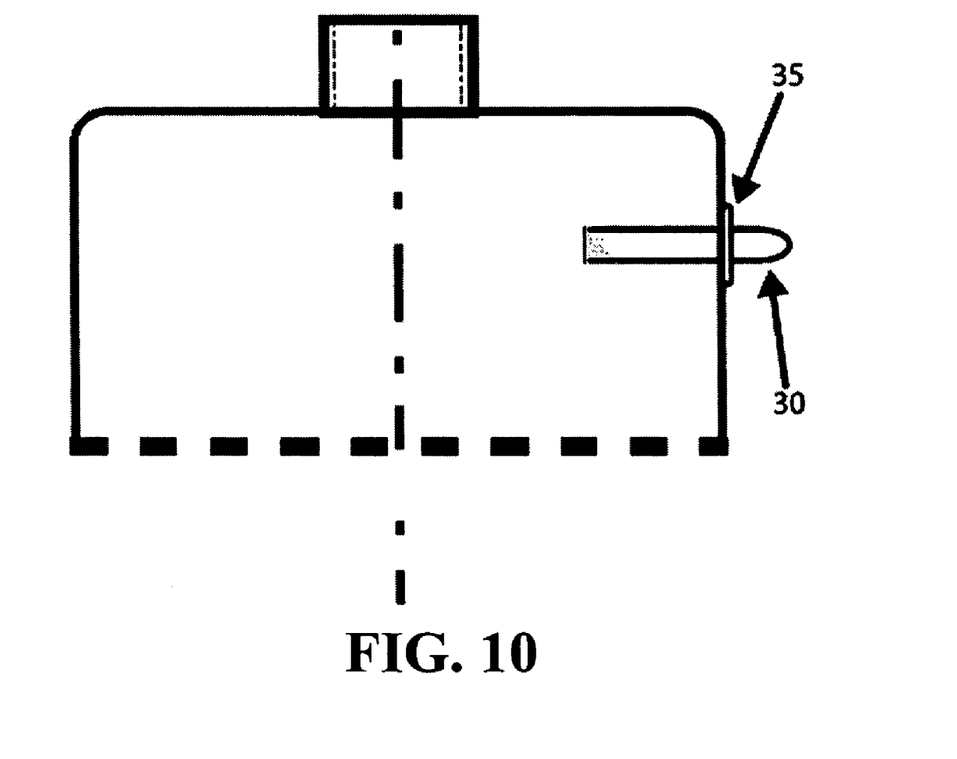
FIG. 10 is a schematic representation of a cross-section of a gas filter with the preferred embodiment of the invention installed in it from the side of the filter. This arrangement may be needed in some cases to facilitate the installation and/or the visibility of the color of the powder.

In a most preferred embodiment, the residual life indicator comprises a small transparent plastic tube, with its closed end slightly protruding out of the filter and its open end covered with a porous barrier for solids made out of a material such as polyethylene or polyacrylate fabric. The chromophoric powder may be activated silica, −150+200 mesh, and coated with the appropriate chromophore for the contaminating gas. The tube is inserted to alert when the polluting gas reached 90% of the bed depth. A colored chart such as shown in FIG. 5 can be glued or otherwise secured to the external wall of the filter around the protruding end of the indicator.

Figures 11, 12:
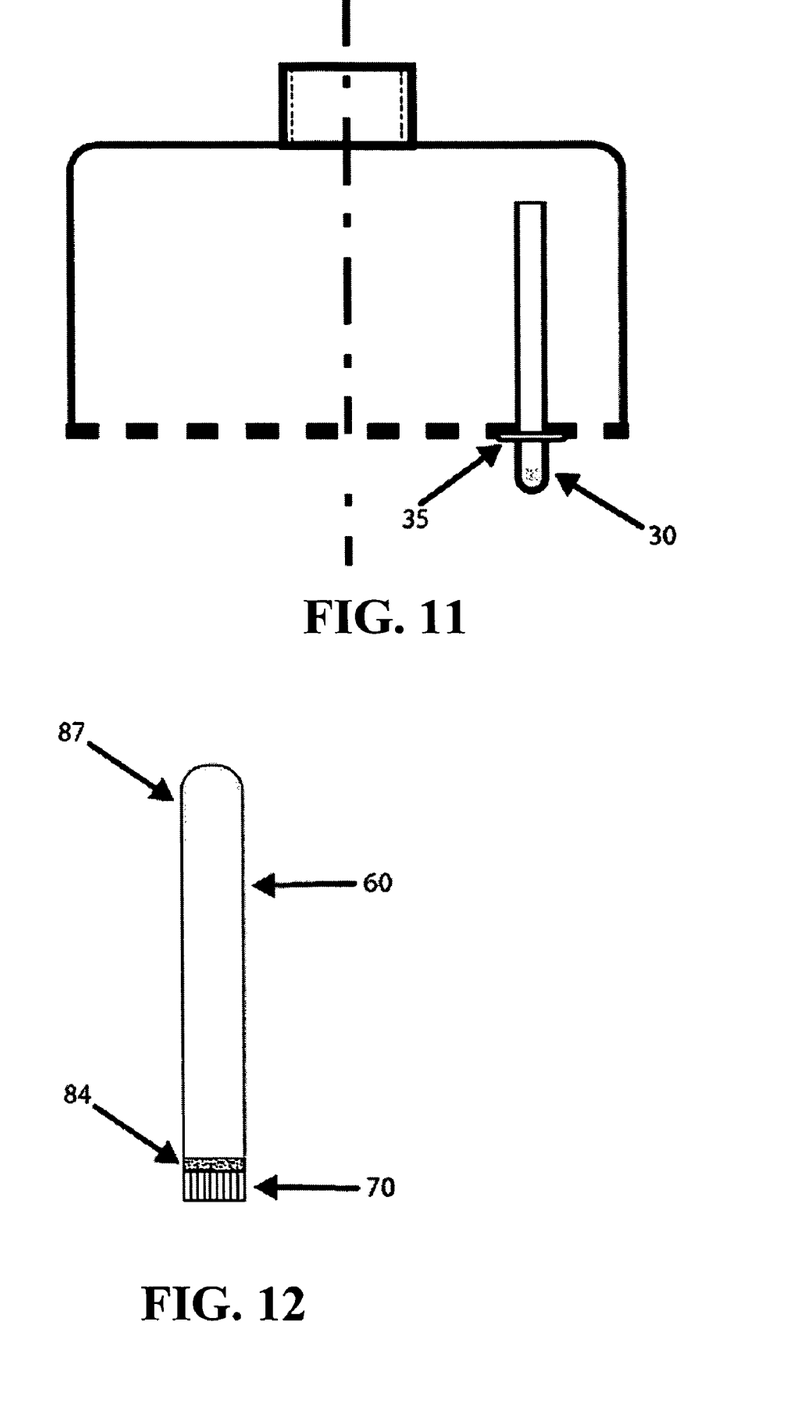
FIG. 11 is a schematic representation of a cross-section of a gas filter with a preferred embodiment of the invention installed in it from the air entrance side of the filter. This arrangement may be necessary in some cases to facilitate the installation and/or the visibility of the color of the powder.
FIG. 12 shows an alternative design of an ESLI in accordance with the present invention. In this design, a layer of reactive material 84 is placed on the inner part of the porous barrier 70 and a chromophoric coating 87 is placed on the inside of the transparent part of the conduit.
Figure 13:
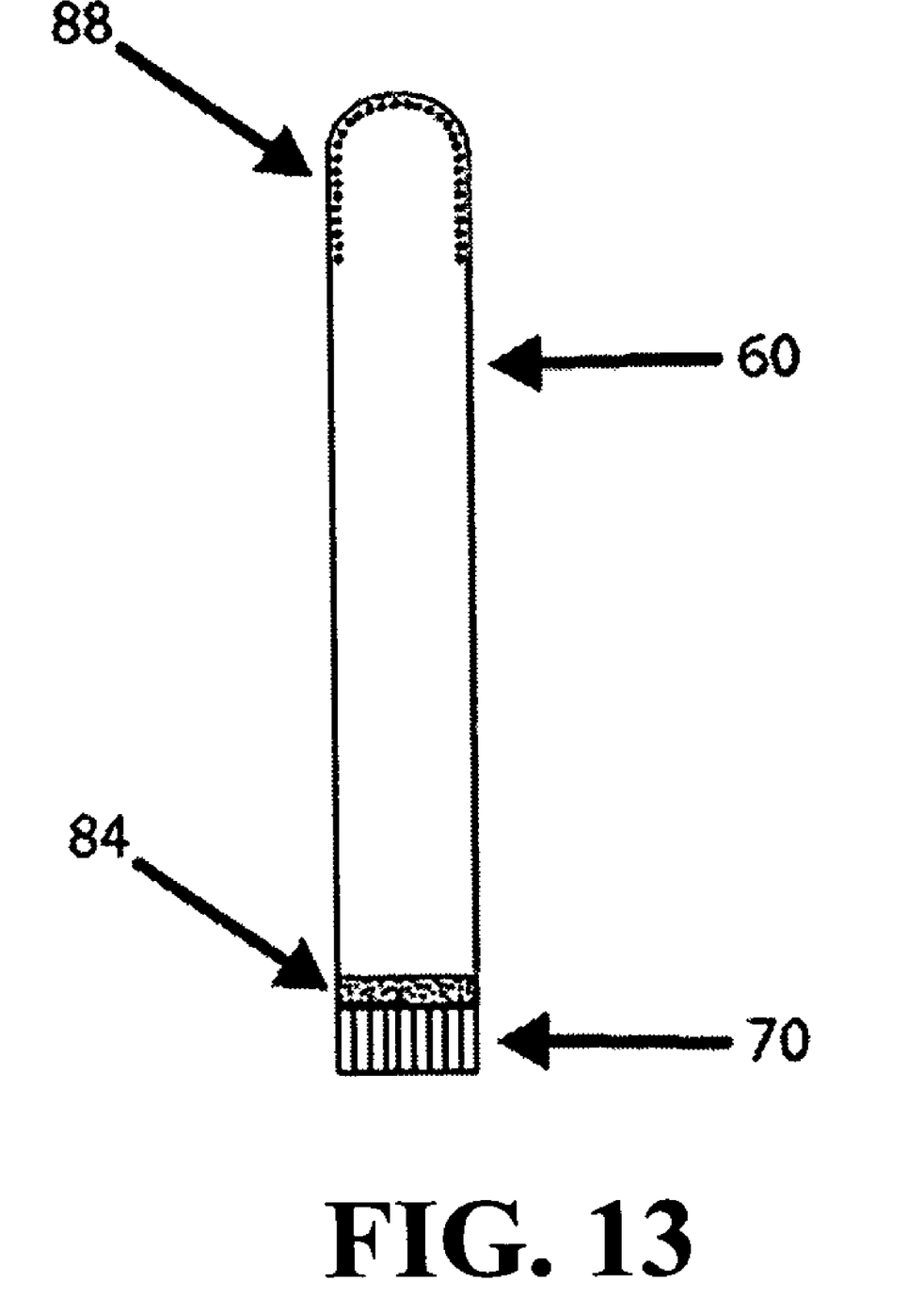
FIG. 13 shows the design of the ESLI of this invention described in FIG. 12 after the indicator detected an end of service. In this design, the chromophoric coating 87 of FIG. 12 changes its color and acquires a different but visible color 88 that can be seen through the transparent part of the conduit.

Another preferred embodiment of the residual life indicator of the present invention comprises a small transparent plastic tube, possibly with its closed end slightly protruding out of the filter and its open end covered with a porous barrier for solids. A chromophoric coating is placed in the inside of the conduit at the transparent section. The ESLI is inserted into the filter bed to alert when the polluting gas has reached 90% of the bed depth. When the target gas reaches the ESLI, it reacts with the chromophoric material 87 and changes its color. The color change is visible through the transparent end and may be compared to a color chart such as shown in FIG. 5, glued or otherwise secured to the external wall of the filter around the protruding end of the indicator.

Another preferred embodiment of the residual life indicator of this invention comprises a small transparent plastic tube, with its closed, transparent end, possibly slightly protruding out of the filter and its open end covered with a porous barrier for solids. A material that can react with the target pollutant and release gas is placed on the inside of the barrier and a chromophoric coating is placed in the inside of the conduit at the transparent section. The ESLI is inserted into the filter bed to alert when the polluting gas has reached 90% of the bed depth. When the target gas reaches the ESLI, it reacts with the reactive material 84 and releases gas. The gas diffuses to the other end of the conduit, reacts with chromophoric layer and forms a visible color change. A colored chart such as shown in FIG. 5 is glued or otherwise secured to the external wall of the filter around the protruding end of the indicator.

The present invention thus provides an end-of-service-life-indicator (ESLI), which can be inserted into a filter to a desired depth for indicating that the useful life of the filter after exposure to contaminants is about to end. Such indicator in one embodiment includes a conduit with at least one transparent portion at one end thereof, a chromophoric powder contained in the conduit and freely movable therein, a porous, gas-permeable material at the other end of the conduit, and a color chart showing the color of the chromophoric powder prior to exposure to a target gas, and the color of the chromophoric powder after exposure to the target gas.

The conduit can be constituted by a solid cylindrical tube, e.g., fabricated of a material selected from the group consisting of glass, plastic, ceramic, metal, and coated paper, plastic and metal film. The indicator conduit advantageously includes a transparent portion at one end of the conduit comprising a transparent window fabricated of glass or plastic, or other suitable material. The porous, gas-permeable material at the other end of the conduit is fabricated from a material selected from among glass fibers, membranes, porous metal, natural fibers such as cotton, porous filter paper, woven or unwoven polymeric fibers, ceramic membranes or any other porous material The chromophoric powder can be of any suitable type, and in one embodiment comprises a material selected from the group consisting of silica, silica gel, alumina, lanthanum oxide, polymer particles, metal particles, ceramic particles, glass particles, beads, and materials that react chromogenically with the target gas. The chromophoric materials can be single-component materials or mixtures, used neat or comprising a substrate that is coated or filled with chromophoric materials and additives, silica or silica gel, alumina, other metal oxides such as lanthanum oxide, polymer particles such as polyethylene, polypropylene, polyethylene oxide, polyesters or Nylon particles, etc. metal particles such as copper, silver iron or other metals or their alloys, ceramic particles, glass particles or beads, and any other material which can react chromogenically with the target gas or which can support or carry materials which can react chromogenically with the target gas.

The chromophoric powder can be coated with a chromophore selected from among sodium permanganate, potassium permanganate, potassium chromate, sodium chromate, corresponding dichromates, lead salts such as lead acetate, and pH indicators such as bromothymole blue, methyl red, etc., lactones, amines, aldehydes, etc. with or without other materials such as polymers, buffering materials, etc. This list of chromophores is a very small fraction of the thousands of chemicals that may be used as chromophores for specific gases or groups of gases. Therefore, the previously-named chemicals is not intended to limit the range of possible chromophores but rather to serve only as examples of possible chromophores.

In use of the end-of-service-life-indicator, the conduit can be inserted into the filter from the side, e.g., from the side opposite to the breathing side. The invention therefore contemplates an assembly of the end-of-service-life-indicator, in combination with a filter into which the end-of-service-life-indicator has been inserted, in a target gas sensing position therein. The filter can include a hole, on its front, side or back, with the conduit being inserted into the filter only before the use of the filter. The filter may thus be provided in the first instance in a form including a hole, optionally plugged with a dummy insert, on its front, side or back, with the conduit being inserted into the filter only before the use of the filter.

Alternatively, the end-of-service-life-indicator can be arranged with more than one ESLI inserted into the filter to different depths or into different locations to give a user multiple indications of the level of use of the filter.

In the end-of-service-life-indicator, the conduit may contain a mixture of chromophoric powders that are chromogenically responsive to the same gas or to different gases. The chromogenic powder can be of any suitable type, and can for example include an oxidizer selected from the group consisting of permanganates, chromates, dichromates, chlorates, perchlorates, bromates, iodates, periodates, and metal peroxides, or any other oxidizing material that can oxidized organic compounds. In another variation, the chromogenic powder can include a pH indicator that changes its color upon contact with an acidic or with a basic compound.

As yet another variation, the chromogenic powder can include a metallic powder that changes its color upon reaction with a gas such as hydrogen sulfide, acids and others. In a further embodiment, the chromogenic powder includes a metallic oxide powder that changes its color upon reaction with gases selected from the group consisting of hydrogen sulfide, acids, and reducing gases.

In one specific embodiment, the chromogenic powder contains mercury compounds reactive with gas such as arsine, phosphine and others, to yield a color change. In another specific embodiment, the chromogenic powder contains compounds reactive with aldehydes or ketones or related compounds to yield a color change. A still further embodiment, involves use of a chromogenic powder that contains compounds reactive with hydrazine or hydrazine derivatives or related compounds to yield a color change. Yet another embodiment, involves the use of a chromogenic material containing compounds that can react with organic phosphonates such as Sarin and Soman or phosphates and their derivatives, to yield a color change. Another embodiment includes the use of a chromogenic powder that contains compounds reactive with gas selected from the group consisting of 2 halo-sulfides, 2 halo-arsenic compounds such as mustard gas or Lewisite and similar compounds, to yield a color change.

The features and advantages of the present invention are more fully shown with respect to the following example, which is not intended to be limitingly construed, as regards the character and scope of the present invention.

EXAMPLE 1

A residual life indicator comprising a small diameter glass tube having the shape of a test tube and containing a chromophoric powder with particle size −60+200 mesh is sealed at its open end with a 0.03 mm thick fabric made of polyurethane fibers.

For the purpose of evaluating the various chromophoric powders, silica gel −100+200 mesh was used as a support matrix. In each case, 0.1 gram powder was placed in 6.95 mm OD glass tubes.

EXAMPLE 2

Set out below is a listing of some target gases, together with suitable chromaphore material, associated solvent medium, solid on which the chromaphore is deposited, and the drying conditions for makeup of the chromaphoric powder material for use in indicator devices according to the present invention.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention. This includes any chromophore or mixture of chromophores even if not explicitly specified herein.

| Target gas | Chromo-phore | mg | Solvent | ml | Solid | gm | Drying Conditions Temp. C. | Time, Min. |
|---|---|---|---|---|---|---|---|---|
| Ammonia/ | BTB | 25 | Ethanol | 5 | Silica | 2 | 100 | 5 |
| Acidic | MR | 25 | Ethanol | 5 | Silica | 2 | 100 | 5 |
| H$_2$S | Pb(Ac)$_2$ | 500 | Water | 5 | Silica | 2 | 120 | 15 |
| Hydro-carbons | KMnO$_4$ | 28 | Water | 5 | Silica | 2 | 105 | 10 |
| Alcohols | K$_2$Cr$_2$O$_7$ | 30 | Water | 5 | Silica | 2 | 130 | 5 |

BTB: Bromo Thymole Blue.
MR: Methyl Red.

What is claimed is:

1. An end-of-service-life-indicator (ESLI), which can be inserted into a filter to a desired depth for indicating that the useful life of the filter after exposure to contaminants is about to end, comprising:
   a conduit with at least one transparent portion at one end thereof;
   a chromophoric powder contained in the conduit and freely movable therein;
   a porous, gas-permeable material at the other end of the conduit; and
   a color chart showing the color of the chromophoric powder prior to exposure to a target gas, and the color of the chromophoric powder after exposure to the target gas.

2. The end-of-service-life-indicator of claim 1, wherein the conduit comprises a solid cylindrical tube.

3. The end-of-service-life-indicator of claim 1, wherein the conduit is fabricated of a material selected from the group consisting of glass, plastic, ceramic, metal, and coated paper, plastic and metal film.

4. The end-of-service-life-indicator of claim 1, wherein the transparent portion at one end of the conduit comprises a transparent window fabricated of glass or plastic.

5. The end-of-service-life-indicator of claim 1, wherein the porous, gas-permeable material is fabricated from a materials selected from the group consisting of fibers, membranes, porous metal, natural fibers, porous filter paper, woven or unwoven polymeric fibers, and ceramic membranes.

6. The end-of-service-life-indicator of claim 1, wherein the chromophoric powder comprises a material selected from the group consisting of silica, silica gel, alumina, lanthanum oxide, polymer particles, metal particles, ceramic particles, glass particles, beads, and materials that react chromogenically with the target gas.

7. The end-of-service-life-indicator of claim 1, wherein the chromaphoric powder is coated with a chromophore selected from the group consisting of sodium permanganate, potassium permanganate, potassium chromate, sodium chromate, corresponding dichromates, lead salts, and pH indicators, optionally with additional components selected from the group consisting of polymers and buffering materials.

8. The end-of-service-life-indicator of claim 1, wherein the conduit is inserted into the filter from the side.

9. The end-of-service-life-indicator of claim 1 as disposed in a breathing apparatus including a filter having a breathing side, wherein the conduit is inserted into the filter from the side opposite to the breathing side.

10. The end-of-service-life-indicator of claim 1, in combination with a filter into which the end-of-service-life-indicator has been inserted, in a target gas sensing position therein.

11. The end-of-service-life-indicator of claim 1, wherein the filter includes a hole, on its front, side or back and the conduit is inserted into the filter only before the use of the filter.

12. The end-of-service-life-indicator of claim 1, wherein the filter includes a hole, optionally plugged with a dummy insert, on its front, side or back and the conduit is inserted into the filter only before the use of the filter.

13. The end-of-service-life-indicator of claim 1, wherein more than one ESLI are inserted into the filter to different depths or into different locations to give a user multiple indications of the level of use of the filter.

14. The end-of-service-life-indicator of claim 1, wherein the conduit contains a mixture of chromophoric powders that are chromogenically responsive to the same gas or to different gases.

15. The end-of-service-life-indicator and filter of claim 10, wherein the filter includes a hole on its front, side or back, and the conduit is inserted into the filter only before the use of the filter.

16. The end-of-service-life-indicator of claim 15, wherein the hole is plugged with a removable dummy insert accommodating removal of the insert to accommodate insertion of the conduit of the end-of-service-life-indicator for use thereof.

17. The end-of-service-life-indicator of claim 1, wherein the chromogenic powder comprises an oxidizer selected from the group consisting of permanganates, chromates, dichromates, chlorates, perchlorates, bromates, iodates, periodates, and metal peroxides.

18. The end-of-service-life-indicator of claim 1, wherein the chromogenic powder comprises a pH indicator that changes its color upon contact with an acidic or with a basic compound.

19. The end-of-service-life-indicator of claim 1, wherein the chromogenic powder comprises a metallic powder that changes its color upon reaction with a gas selected from the group consisting of hydrogen sulfide and acids.

20. The end-of-service-life-indicator of claim 1, wherein the chromogenic powder comprises a metallic oxide powder that changes its color upon reaction with gases selected from the group consisting of hydrogen sulfide, acids, and reducing gases.

21. The end-of-service-life-indicator of claim 1, wherein the chromogenic powder contains mercury compounds reactive with gas selected from the group consisting of arsine and phosphine to yield a color change.

22. The end-of-service-life-indicator of claim 1, wherein the chromogenic powder contains compounds reactive with aldehydes or ketones to yield a color change.

23. The end-of-service-life-indicator of claim 1, wherein the chromogenic powder contains compounds reactive with hydrazine or hydrazine derivatives to yield a color change.

24. The end-of-service-life-indicator of claim 1, wherein the chromogenic material contains compounds that can react with organic phosphonates selected from the group consisting of sarin, soman and phosphates and their derivatives, to yield a color change.

25. The end-of-service-life-indicator of claim 1, wherein the chromogenic powder contains compounds reactive with gas selected from the group consisting of 2 halo-sulfides, 2 halo-arsenic compounds, mustard gas, and Lewisite, to yield a color change.

* * * * *